United States Patent [19]
Gearing

[11] Patent Number: 5,900,033
[45] Date of Patent: May 4, 1999

[54] APPARATUS AND METHOD FOR IMPROVED OPTICAL GLASS GOB PREFORM PRODUCTION

[75] Inventor: Daniel R. Gearing, Rochester, N.Y.

[73] Assignee: Eastman Kodak Company, Rochester, N.Y.

[21] Appl. No.: 08/866,854

[22] Filed: May 30, 1997

Related U.S. Application Data

[60] Provisional application No. 60/027,733, Oct. 3, 1996.

[51] Int. Cl.[6] .................................. C03B 7/00; C03B 7/08
[52] U.S. Cl. .............................. 65/126; 65/127; 65/324; 65/325; 65/375
[58] Field of Search ................................ 65/66, 122, 123, 65/126, 127, 128, 129, 207, 221, 303, 324, 325, 375, 333, 21.1, 142, 225, 304, 330; 222/575, 566, 571; 137/801, 802; 138/177; 141/392; 422/99

[56] References Cited

U.S. PATENT DOCUMENTS

| | | |
|---|---|---|
| 1,458,834 | 6/1923 | Lott . |
| 1,675,273 | 6/1928 | Keller . |
| 1,790,984 | 3/1931 | Greer . |
| 3,119,679 | 1/1964 | Seymour . |
| 3,130,028 | 4/1964 | Seymour . |
| 3,211,196 | 10/1965 | Rozinak . |
| 3,271,126 | 9/1966 | Jenkins . |
| 3,293,017 | 12/1966 | Jenkins . |
| 3,351,449 | 11/1967 | Ambrogi . |
| 3,833,347 | 9/1974 | Angle et al. . |
| 3,874,866 | 4/1975 | Iacovazzi et al. ........................ 65/164 |
| 4,139,677 | 2/1979 | Blair et al. . |
| 4,168,961 | 9/1979 | Blair . |
| 4,460,398 | 7/1984 | Sasaki . |
| 4,832,725 | 5/1989 | Rehring . |
| 5,114,456 | 5/1992 | Weisenburger et al. . |
| 5,540,746 | 7/1996 | Sasaki et al. . |
| 5,709,723 | 1/1998 | Gearing . |

FOREIGN PATENT DOCUMENTS

| | | |
|---|---|---|
| 97202897 | 9/1997 | European Pat. Off. . |
| 05052979 | 2/1993 | Japan . |
| 07002270 | 1/1995 | Japan . |
| 1131746 | 5/1966 | United Kingdom . |

*Primary Examiner*—Steven P. Griffin
*Attorney, Agent, or Firm*—Mark G. Bocchetti

[57] ABSTRACT

A gob formation device and method for improved production of molten glass preforms for use in the precision glass molding of optical glass elements. The device is a dispensing tip which is attached to a stem extending from a working crucible containing a supply of molten glass. The dispensing tip includes a longitudinal bore through which the molten glass flows, and a downwardly projecting gob formation surface located at a distal end of tip. The downwardly projecting gob formation surface is preferably convex which aids in achieving greater uniformity of mass in the gob formation process as well as improving preform internal quality.

9 Claims, 3 Drawing Sheets

APPARATUS AND METHOD FOR IMPROVED OPTICAL GLASS GOB PREFORM PRODUCTION

CROSS REFERENCE TO RELATED APPLICATION

Reference is made to and priority claimed from U.S. Provisional Application Ser. No. U.S. 60/027,733, filed Oct. 3, 1996, entitled APPARATUS FOR IMPROVED OPTICAL GLASS GOB PREFORM PRODUCTION.

BACKGROUND OF THE INVENTION

1. Field of the Invention

The present invention relates generally to the molding of optical glass lenses and, more particularly, to the production of molten optical glass gob preforms to be used in a precision glass molding process.

2. Brief Description of the Prior Art

Various methods and apparatus for the compression molding of glass optical elements are known in the prior art. With these methods and apparatus, optical element preforms, sometimes referred to as gobs, are compression molded at high temperatures to form glass lens elements. The basic process and apparatus for molding glass optical elements is taught in a series of patents assigned to Eastman Kodak Company. Such patents are U.S. Pat. No. 3,833,347 to Angle et al, U.S. Pat. No. 4,139,677 to Blair et al, and U.S. Pat. No. 4,168,961 to Blair. In the practice of the process described in such patents, a glass preform or gob is inserted into a mold cavity. The molds reside within a chamber in which is maintained a non-oxidizing atmosphere during the molding process. The preform is then heat softened by increasing the temperature of the mold to thereby bring the preform up to about 100° C. above the glass transition temperature ($T_g$) for the particular type of glass from which the preform has been made. Pressure is then applied by the mold to force the preform to conform to the shape of the mold. The mold and preform are then allowed to cool below the transition temperature of the glass. The pressure from the mold is then relieved. The temperature is lowered further and the finished molded lens is removed.

Because precision glass molding of optical elements is done by compression rather than by injection (as is utilized in plastic molding), a precursor metered amount of glass, typically referred to as a preform or gob is required. Although good quality gobs or preforms can be produced through grinding and polishing, it is preferable that a molten gob dropping process be used for economic reasons. U.S. Pat. No. 3,293,017 and U.S. Pat. No. 3,271,126 describe an apparatus and method for fabricating small glass wafers by means of dripping molten glass from an orifice in single drops or gobs into a catching, pressing and cooling mechanism. However, these glass wafers were not intended for optical purposes. Their stated purpose was for ceramic barrier layer capacitors. These patents failed to teach anything specific with regard to the geometry of the nozzle through which the molten glass gobs or preforms are formed with the exception of the drawings which merely depict a straight tubular structure.

In the production of gobs or preforms to be used in a precision glass molding process for molding optical glass elements, it is critical that each gob or preform have good internal quality and that the gobs be repeatable in size. Nothing in the prior art teaches that nozzle geometry can be used to control gob size and improve internal quality of the gob formed therewith.

SUMMARY OF THE INVENTION

It is, therefore, an object of the present invention to provide a nozzle apparatus which promotes repeatability of drop size for forming molten glass gobs for use in a precision glass molding process.

It is a further object of the present invention to provide an improved nozzle apparatus for use in producing molten glass gobs with good internal quality.

Briefly stated, these and numerous other features, objects and advantages of the present invention will become readily apparent upon a reading of the detailed description, claims and drawings set forth herein. These features, objects and advantages are accomplished through the use of a preformed dispensing tip which includes a convex gob forming surface. The convex gob forming surface must have an outside diameter which is substantially larger than the inside diameter of the stem through which molten glass is transported from a working crucible to the tip. The tip further preferably includes a frusto-conical section which extends from the convex gob forming surface back to the cylindrical portion of the stem to ensure stability of the tip over long term use at high temperatures.

DETAILED DESCRIPTION OF THE PREFERRED EMBODIMENTS

Figure 1A:
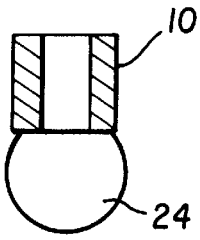
FIG. 1a is a cross-sectional view of a prior art tip having a nonwetting glass gob protruding therefrom.
Figure 1B:
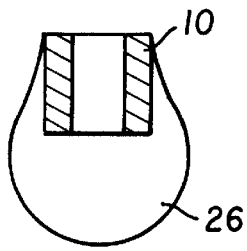
FIG. 1b is a cross-sectional view of a prior art tip having a glass gob of a wetting glass protruding therefrom.
Figure 2:
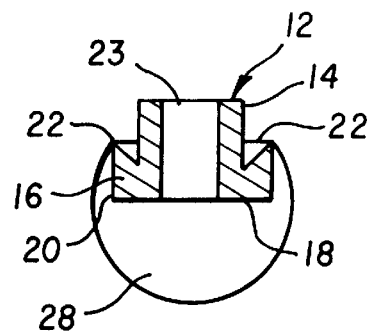
FIG. 2 is a cross-sectional view of a prior art tip having a glass gob of a wetting glass protruding therefrom.

Turning first to FIGS. 1a, 1b and 2, there are shown two prior art tip geometry's. Prior art tip 10 (shown in FIGS. 1a and 1b) has a straight cylindrical configuration. The tip outside diameter is the main determining factor for defining the volume of preforms dispensed therefrom. The tip inside diameter is the main determining factor for the flow rate of molten glass therethrough. The machining of the tip face must be free of marks, burrs, nicks and contamination to maintain internal glass quality.

FIG. 2 shows a tip 12 with the tubular portion 14 and then enlarged cylindrical portion 16. The enlarged cylindrical portion 16 includes a flat or planar formation surface 18 and an outer cylindrical surface 20. The enlarged cylindrical portion 16 is undercut at an acute angle from cylindrical surface 20 to create a circular edge 22 which acts as a wetting limit. There is, of course, a cylindrical bore 23 which aligns with the bore through stem 38.

In the production of molten preforms which are repeatable in size and have good internal quality, it is necessary to consider not only tip geometry but also the wettable characteristics of the particular glass being used. Wettability is the degree to which a solid is wetted by a liquid and is measured by the force of adhesion between the two phases and evidenced by the angle formed at the interface junction with air In the production of glass preforms, the solid is the material from which the tip is made and the liquid is the molten glass. It is necessary to consider wettability in tip design because excess glass clinging to the outer circumference of the tip can cause problems relating to quality (striae) as well as weight control.

Typically, the material of choice for the tip is a platinum alloy. There are several optical glass types which have been observed to be non-wetting to platinum. In these cases, a straight wall of the tip design such as shown in FIG. 1a is acceptable thereby producing a gob 24 which is repeatable in size and has good internal quality. With those glasses which are very wetting, they produce the undesirable phenomenon depicted in FIG. 1b wherein the portion of the gob 26 creeps up the outside surface of tip 10. This can result in striae and size variability. The tip 12 shown in FIG. 2 is a prior art solution to the wetting phenomenon and results in the production of a gob 28. Glass still wets the outer surface but will not creep over and around circular edge 22, and therefore, circular edge 22 acts as a wetting limit. However, glass still wets the cylindrical surface 20. Further, because the angle of undercut to produce circular edge 22 is as sharp as possible, for small tips 12, this geometry is difficult to machine. In such cases, the use of a platinum/gold alloy instead of pure platinum will sometimes produce the desired wetting characteristics.

Figure 3:
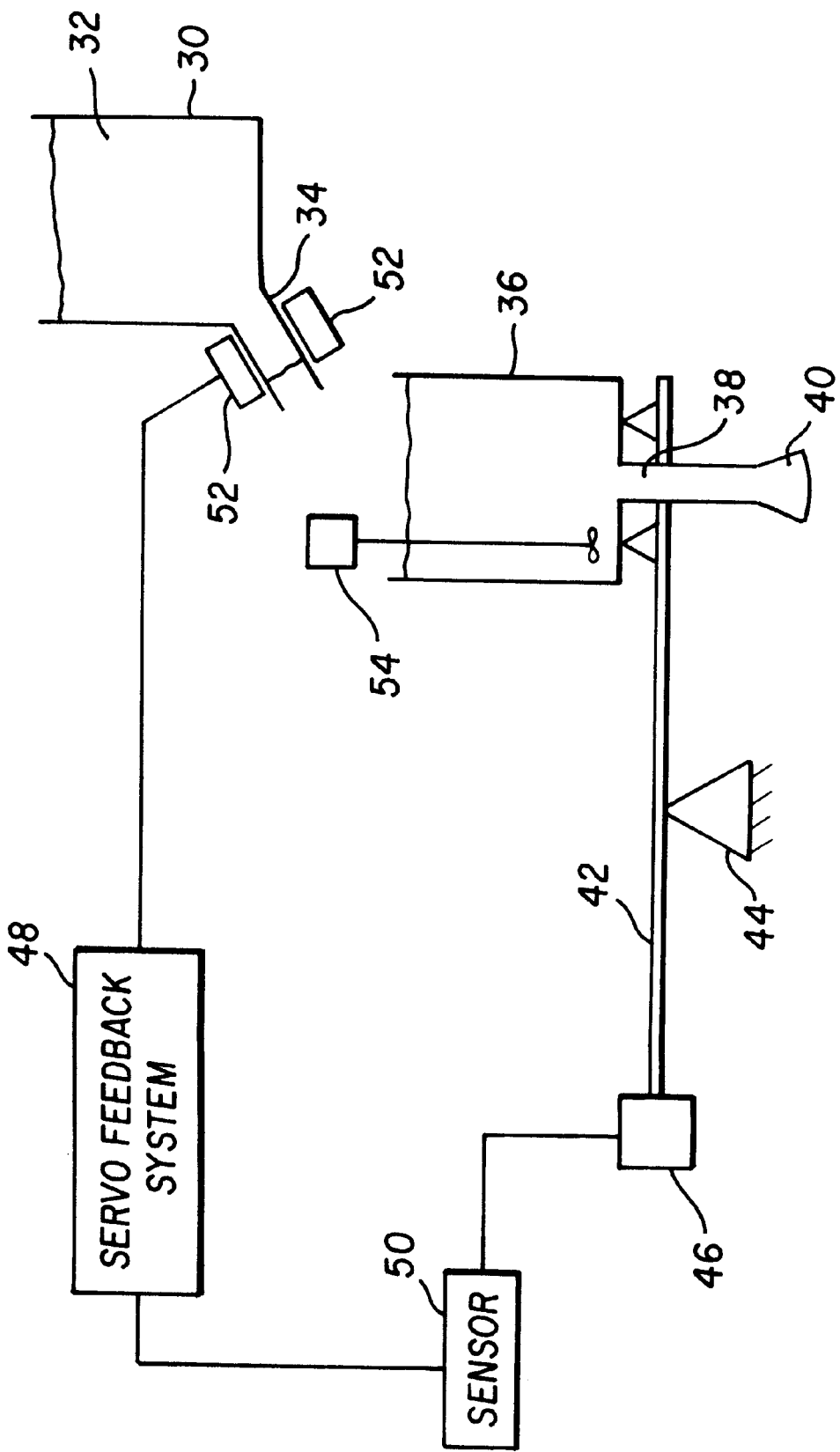
FIG. 3 is a schematic of an apparatus for producing gobs of molten glass of predetermined weight and volume.

Turning next to FIG. 3, there is shown a schematic of an apparatus for producing gobs of molten glass. That apparatus includes a reservoir crucible 30 which holds a supply of molten glass 32. Reservoir crucible 30 is provided with an outlet stem 34 which feeds molten glass from the reservoir crucible 30 to a working crucible 36. The working crucible 36 has a discharge nozzle 38 extending from the bottom thereof. Attached to the discharge nozzle 38, preferably by welding, is the gob dispensing tip 40. The discharge nozzle 38 with its tip 40 are fabricated with the precise geometry in order to assist in defining a flow rate of molten glass therefrom and in order to define a repeatable gob volume. The working crucible 36 is supported at one end of a balance system including a beam 42 spanning a fulcrum 44. At the opposite end of beam 42 is a counterweight 46 as the weight of the working crucible 36 decreases, additional molten glass from the reservoir crucible 30 is delivered in a controlled manner to the working crucible 36. A servo feedback system 48 receives a signal from a sensor 50 sensing the position of counterweight 46. In such manner, as the working crucible 36 is depleted of molten glass, the servo feedback system 48, through sensor 50, detects the low mass of molten glass in the working crucible 36 and thereby produces a signal that regulates heat radiated from heater 52 positioned proximate to outlet stem 34. This temperature regulation of outlet stem 34 of the reservoir crucible 30 acts to meter the flow of molten glass 32 from the reservoir crucible 30 thereby replenishing molten glass to the working crucible 36. In this manner, the pressure head within working crucible 36 and, more particularly, at tip 40 is held relatively constant. Thus, the flow rate of molten glass through discharge nozzle 38 and tip 40 can be controlled to be substantially uniform over an extended period of time. The uniform flow rate in combination with the geometry of the tip 40 ensures that the gob size is both repeatable and of good internal quality. For purposes of uniformity, it is beneficial to provide a supplemental heating device in close proximity to the discharge nozzle 38 and tip 40. The working crucible 36 maybe equipped with a stirring mechanism 54 in order to avoid the formation and entrainment of bubbles in the molten glass within working crucible 36.

Gobs are typically referred to as small gobs or large gobs. Usually, large gobs weigh one (1) gram and above. To make small gobs, the temperature controls on the tip 40 are set so that the molten glass drips to form drops or gobs of a predetermined and repeatable size. The gobs are dropped onto a catching tool (not shown).

Figure 4:
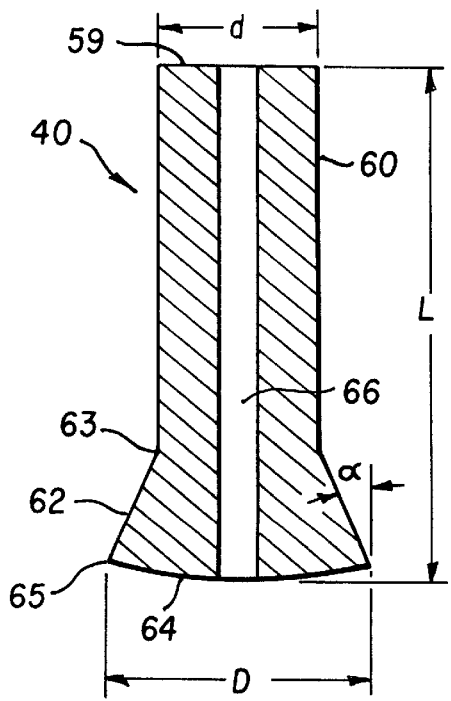
FIG. 4 is a cross-sectional view of the preferred embodiment tip of the present invention.

Looking next at FIG. 4 there is shown in cross section the preferred embodiment of the tip 40 of the present invention. As with the prior art tips 10, 12 as depicted in FIGS. 1a, 1b and 2, tip 40 is preferably attached at a proximal end 59 to stem 38 by means of welding. Tip 40 includes a cylindrical portion 60 and a frusto-conical portion 62. Frusto-conical portion 62 includes a minor circumferential edge 63 and a major circumferential edge 65. The frusto-conical portion 62, which resides at the distal end of tip 40, terminates in a convex gob formation surface 64. There is, of course, a longitudinal bore 66 through tip 40. The term "convex" as used herein is intended to mean a curved form which bulges outwardly.

By way of example, tip 40 as depicted in FIG. 4 has been used to produce ball shaped gobs from an optical glass identified as Hoya TAC-4 as manufactured by Hoya Corporation of Tokyo, Japan. Each gob produced weighed 437 mg±7 mg. The temperature of the molten glass in the working crucible was 1200° C. The temperature in the tip was between 1000° C. and 1100° C. The dimensions of the tip 40 used for this example were such that the cylindrical portion 60 had a diameter (d) of 0.312 inches. The tip 40 had a length (L) of 0.700 inches. The diameter (D) of the base of the frusto-conical portion 62 was 0.435 inches. The radius of the convex gob formation surface was 1.00 inches. The angle ($\alpha$) of the frusto-conical portion 62 to vertical was 25 degrees. The diameter of bore 66 was 0.040 inches.

Figure 5:
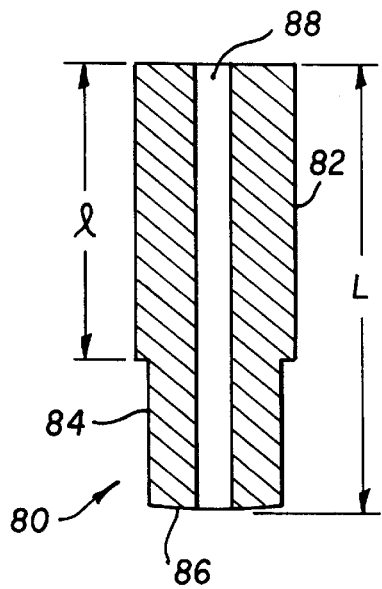
FIG. 5 is a cross-sectional view of an alternative embodiment tip.

An alternative embodiment tip 80 is depicted in FIG. 5. The alternative embodiment tip 80 includes a major cylindrical portion 82 and a minor cylindrical portion 84. Minor cylindrical portion 84 terminates in a convex gob formation surface 86. There is a longitudinal bore 88 through tip 80. This alternative embodiment tip 80 has been used successfully to form ball shaped gobs having a weight of 338 mg±6 mg using Hoya TAF-3 as manufactured by Hoya Corporation of Tokyo, Japan. The temperature of the molten glass in the working crucible was 1200° C. The temperature in the tip was between 1000° C. and 1100° C. The dimensions of this alternative embodiment tip 80 for this example were such that the tip had an overall length (L) of 0.600 inches, the length (l) of the major cylindrical portion was 0.400 inches, the diameter of the major cylindrical portion was 0.312 inches, the diameter of the minor cylindrical portion 84 was 0.285 inches, and the radius of the convex formation surface 86 was 0.800 inches.

Figure 6:
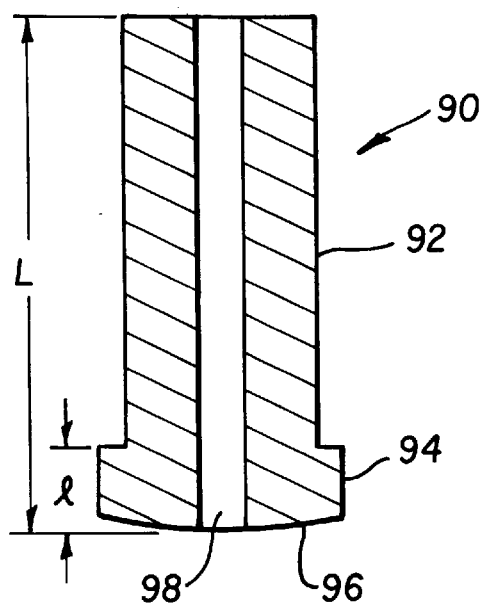
FIG. 6 is a cross-sectional view of a second alternative embodiment tip of the present invention.

Looking next at FIG. 6 there is shown yet another alternative embodiment tip 90. By way of example, this alternative embodiment tip 90 has been used successfully to generate ball shaped gobs or preforms from Hoya TAC-4 crown glass as manufactured by Hoya Corporation of Tokyo, Japan. The ball shaped preforms had a consistent weight of 340 mg±7 mg. In the production of such gobs, the temperature in the working crucible 36 was 1200° C. and the temperature of the tip 90 was in the range of 1000° C. to 1100° C. Alternative embodiment tip 90 includes a minor cylindrical portion 92 and a major cylindrical portion 94 with major cylindrical portion 94 terminating at a convex gob formation surface 96. Once again, there is a longitudinal bore 98 through tip 90. To produce the 340 milligram ball shaped gobs of the above example, tip 90 had a length (L) of 0.600 inches. Major cylindrical portion 94 had a length (U) of 0.100 inches. The radius of convex gob formation surface 96 was 0.600 inches. The diameter of minor cylindrical portion 92 was 0.310 inches. The diameter of major cylindrical portion 94 was 0.325 inches, and the diameter of bore 98 was 0.040 inches.

With the prior art tip design shown in FIG. 2, over a short period of time (approximately two hours), glass would build up on the sides of the tip causing striae in the preforms which made such preform unsuitable for use in molding optical lens elements. At that point it was necessary to shut down the machine and clean the glass from the tip 12. This, of course, would result in lost productivity and lower yields. The tip of the present invention has a convex gob formation surface which avoids the problem of glass creeping up the sides of the tip. The frusto-conical portion 62 aids in keeping the glass on the convex gob formation surface 64 and off the sides of the frusto-conical portion 62. The radius of the gob formation surface 64 can vary depending on the glass type, tip size and material from which the tip is fabricated (platinum or Pt/Au). The radius of the gob formation surface 64 should be determined empirically for each type of glass to be used, the size of the preform to be manufactured and the temperature at which the process will be operated.

Another problem encountered with the particular prior art tip design shown in FIG. 2 is unacceptable size variability between preforms. Over a long period of time the face 18 of tip 12, especially those with outside diameters larger than 0.300 inches, would slump causing the weight of the preforms to slowly decrease until they were out of specification. This slumping action is a slow bending at the weakest boundary, that being the sharpest point of the undercut. At the point in time when the preforms are out of specification, it is necessary to remove tip 12 from the stem of the working crucible and weld a new tip thereto. This, of course, represents a large interruption in the service of the preform manufacturing apparatus. The design of the present invention eliminates the problem by essentially eliminating the undercutting of any portion of the tip. Particularly with regard to tip 40 an enlarged gob formation surface 64 is achieved through the incorporation of the frusto-conical portion 62.

Figure 7:
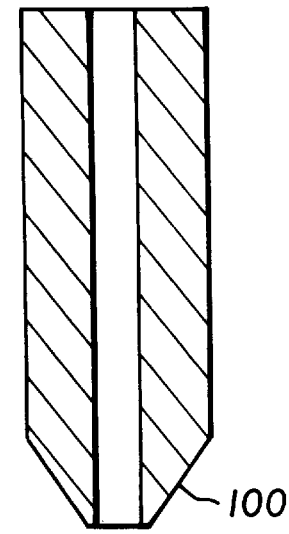
FIG. 7 is a cross-sectional view of a third alternative embodiment tip of the present invention.
Figure 8:
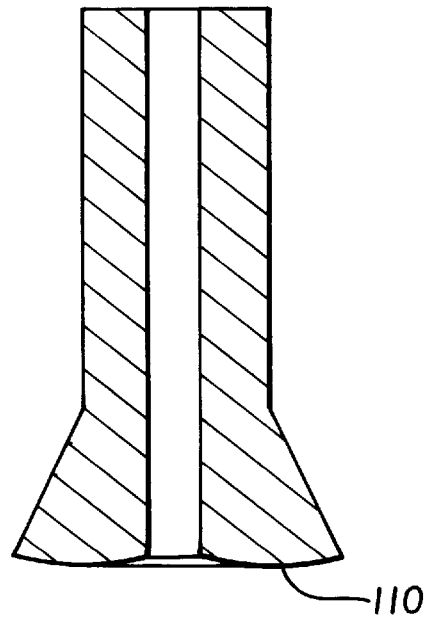
FIG. 8 is a cross-sectional view of a fourth alternative embodiment tip of the present invention.
Figure 9:
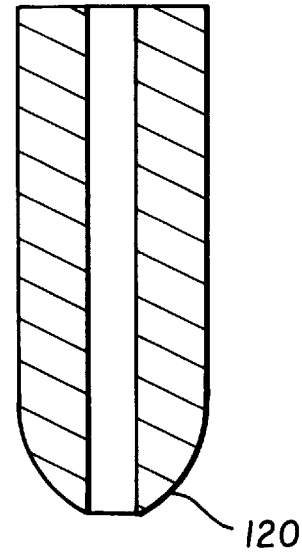
FIG. 9 is a cross-sectional view of a fifth alternative embodiment tip of the present invention.

Although the gob formation surfaces 64, 86, 96 have been described herein as being convex, it is not intended to limit the shape of the gob formation surface to spherical or partially spherical shapes. It is believed that a variety of downwardly protruding non-spherical surface shapes can be used to practice the present invention. Those shapes would include a generally conical or frusto-conical gob formation surface 100 as depicted in FIG. 7, an annular or ring shaped gob formation surface 110 as depicted in FIG. 8, and a bullet-shaped (generally, parabolic in cross section) gob formation surface 120 such as depicted in FIG. 9.

From the foregoing, it will be seen that this invention is one well adapted to attain all of the ends and objects hereinabove set forth together with other advantages which are apparent and which are inherent to the device.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A device for improved dispensing of molten glass gobs comprising:
    (a) a crucible including a discharge nozzle extending therefrom;
    (b) a discharge tip attached to said discharge nozzle, said discharge tip including a frusto-conical section having a major circumferential edge and a minor circumferential edge, said discharge tip having a longitudinal bore therethough;
    (c) a gob formation surface projecting downwardly from said major circumferential edge of said frusto-conical section, said gob formation surface being convex, said gob formation surface having an outside diameter which is substantially greater than an inside diameter of said longitudinal bore.

2. A device as recited in claim 1 wherein:
said gob formation surface is generally spherical.

3. A device as recited in claim 1 wherein:
said gob formation surface is generally aspherical.

4. A device for improved dispensing of molten glass gobs comprising:
    (a) a crucible including a discharge nozzle extending therefrom;
    (b) a discharge tip attached at a proximal end thereof to said discharge nozzle, said discharge tip terminating at a distal end thereof and having a longitudinal bore therethough; and
    (c) a gob formation surface located at said distal end, said gob formation surface projecting downwardly, said gob formation surface being convex and having an outside diameter which is substantially greater than an inside diameter of said longitudinal bore.

5. A method for improved dispensing of molten glass gobs comprising the steps of:
    (a) maintaining a reservoir of molten glass at a temperature at least as great as a melt temperature thereof;
    (b) flowing a portion of the molten glass from the reservoir through a discharge nozzle and a discharge tip, the discharge tip including a frusto-conical section having a major circumferential edge and a minor circumferential edge, the discharge tip having a longitudinal bore therethough;
    (c) accumulating individual gobs of molten glass on a gob formation surface projecting downwardly from the major circumferential edge of the frusto-conical section, the gob formation surface being convex, the gob formation surface having an outside diameter which is substantially greater than an inside diameter of said longitudinal bore; and
    (d) dripping each individual gob from the gob formation surface.

6. A method as recited in claim 5 wherein:
the gob formation surface is generally spherical.

7. A method as recited in claim 5 wherein:
the gob formation surface is generally aspherical.

8. A method as recited in claim 5 further comprising the step of:

forming a series of gobs having substantially uniform size and internal quality.

9. A method for improved dispensing of molten glass gobs comprising the steps of:

(a) maintaining a reservoir of molten glass at a temperature at least as great as a melt temperature thereof;

(b) flowing a portion of the molten glass from the reservoir through a discharge nozzle and a discharge tip, the discharge tip having a longitudinal bore therethough;

(c) accumulating individual gobs of molten glass on a gob formation surface projecting downwardly from the discharge tip, the gob formation surface being convex, the gob formation surface having an outside diameter which is substantially greater than an inside diameter of said longitudinal bore; and (d) dripping each individual gob from the gob formation surface.

* * * * *